March 4, 1930.　　A. E. LINDSTROM　　1,749,219
EGG PRESERVING MACHINE
Filed June 15, 1925　　4 Sheets-Sheet 1
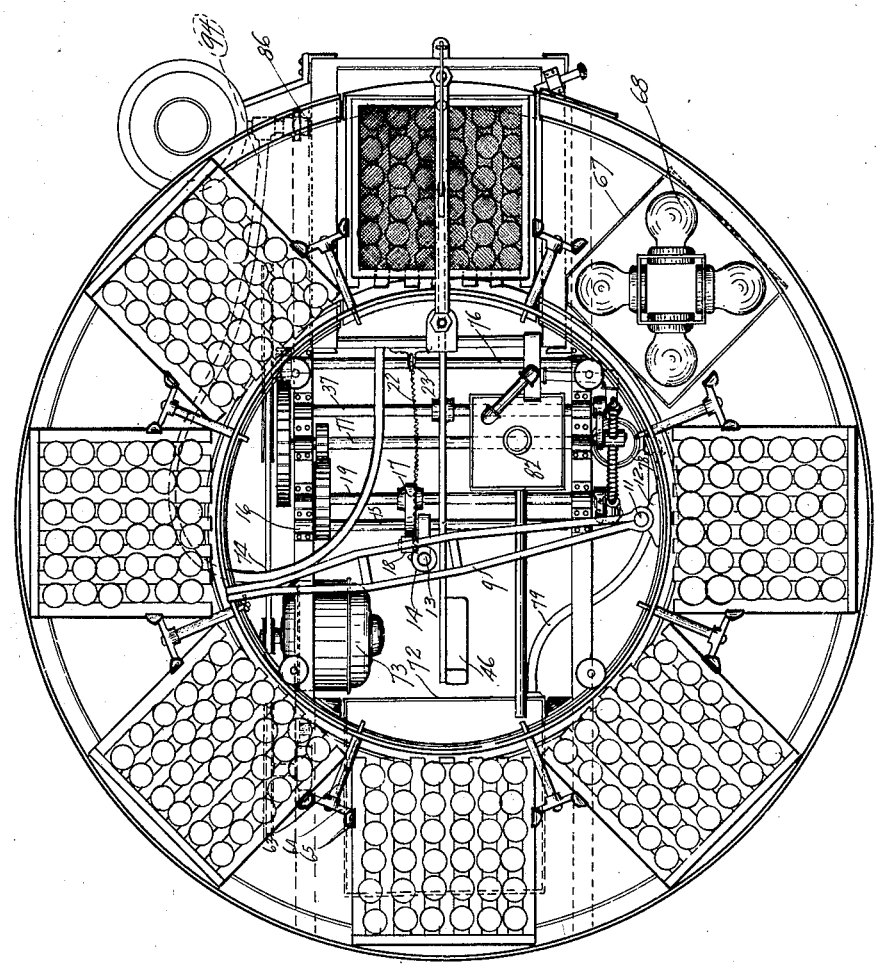
INVENTOR
ANDREW E. LINDSTROM
BY
ATTYS.

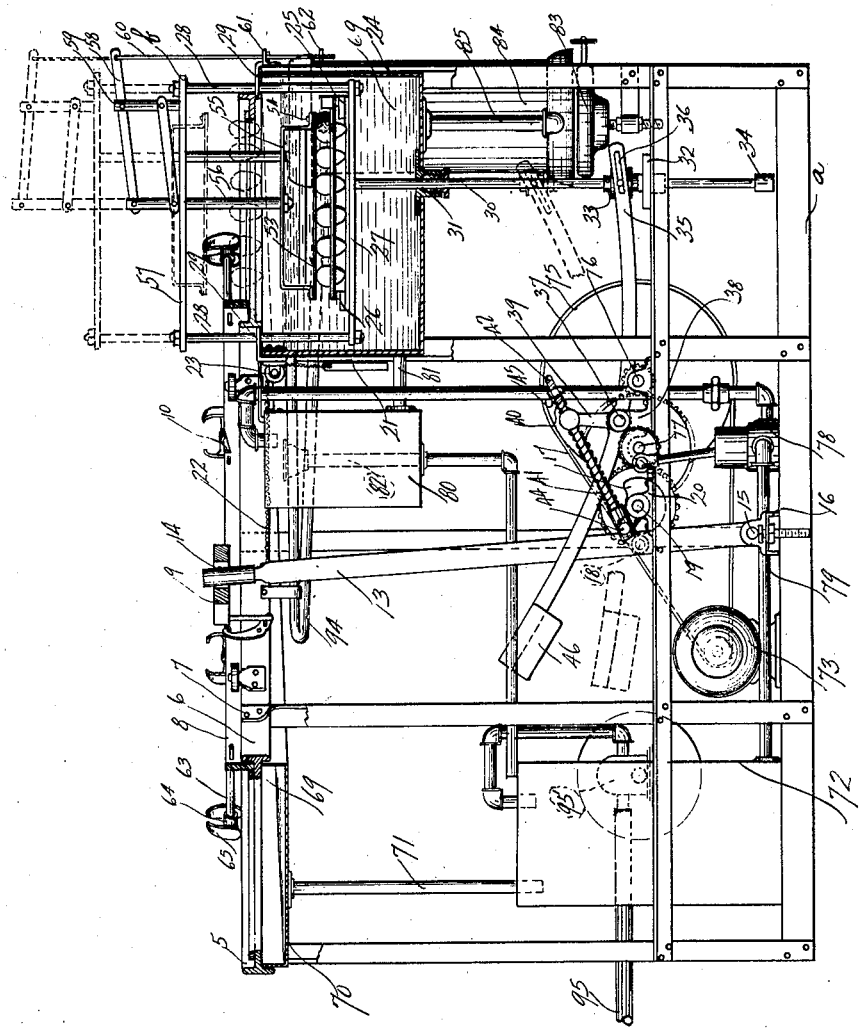

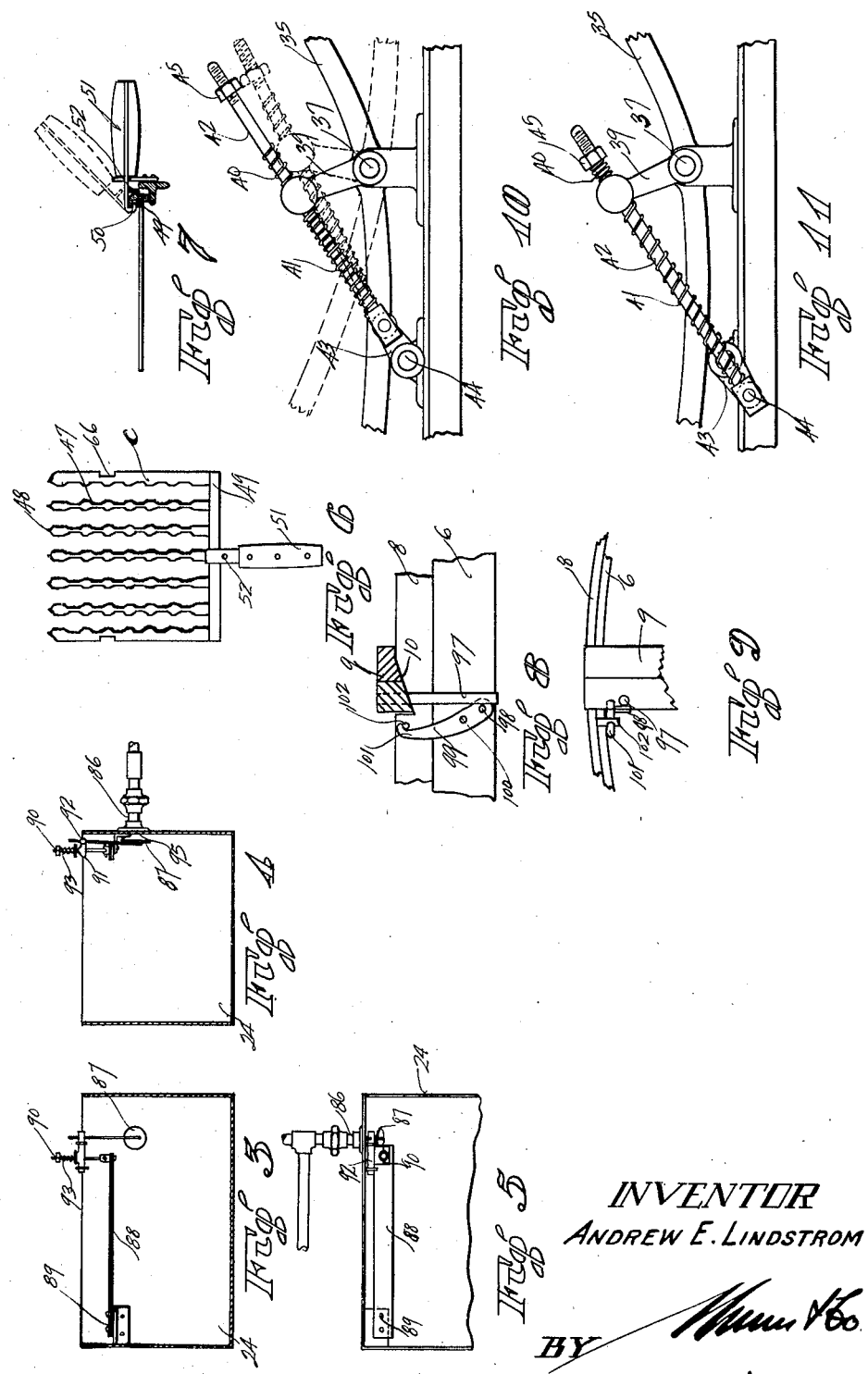

March 4, 1930.  A. E. LINDSTROM  1,749,219
EGG PRESERVING MACHINE
Filed June 15, 1925  4 Sheets-Sheet 4
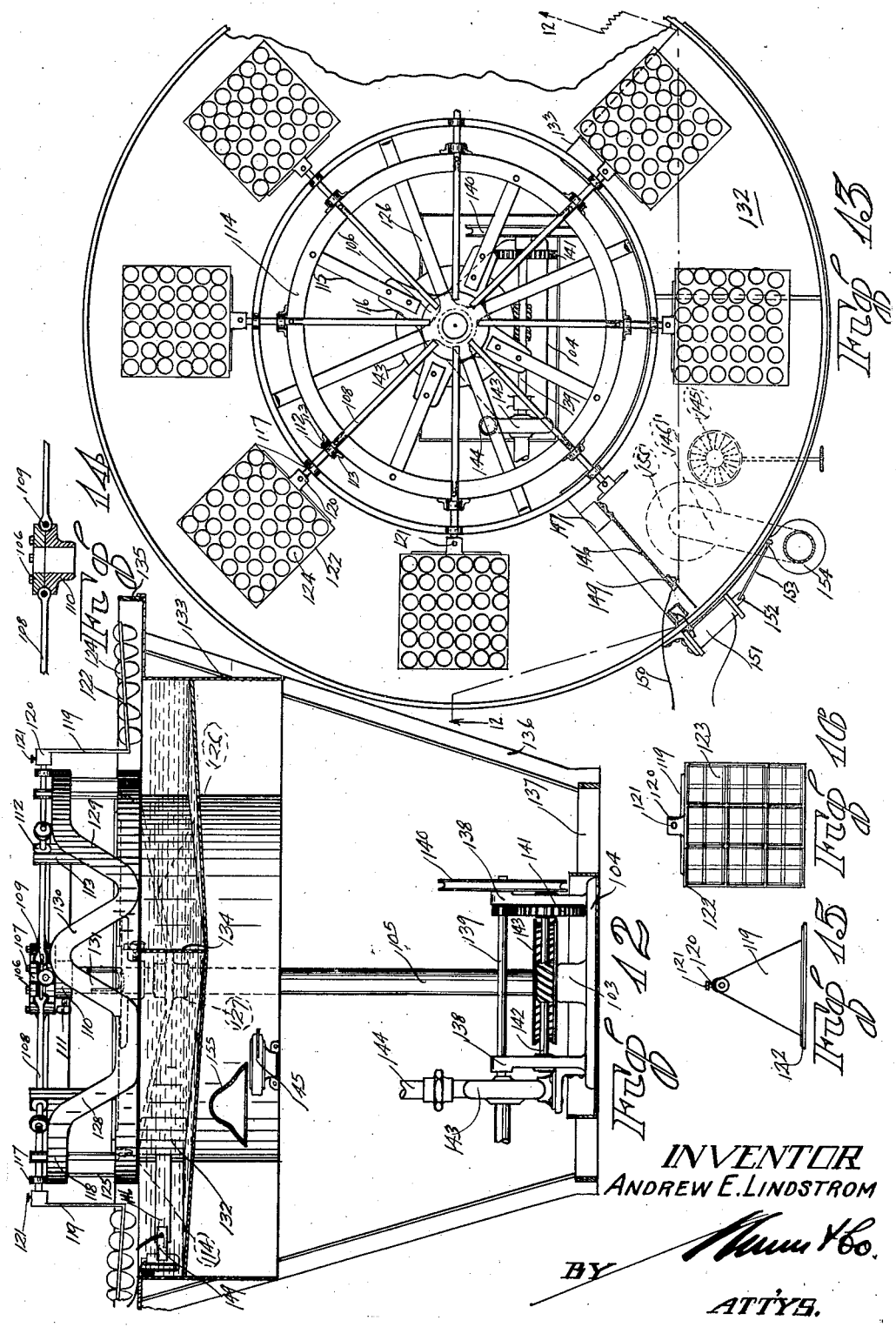
INVENTOR
ANDREW E. LINDSTROM
BY
ATTYS.

Patented Mar. 4, 1930

1,749,219

UNITED STATES PATENT OFFICE

ANDREW E. LINDSTROM, OF SAN FRANCISCO, CALIFORNIA, ASSIGNOR TO KASSER EGG PROCESS COMPANY, OF SAN FRANCISCO, CALIFORNIA, A CORPORATION OF CALIFORNIA

EGG-PRESERVING MACHINE

Application filed June 15, 1925. Serial No. 37,305.

This invention relates to a machine for treating eggs, as for example, for subjecting eggs to the action of a preservative solution or for candling or grading them.

It has been common, in the past, to utilize endless conveyors upon which eggs can be carried past several stations, at which stations the loading, the desired treatment, and the unloading can be effected. In all such prior apparatus, however, there have been outstanding disadvantages.

For example, in one type of prior art machine, the conveyor has a continuous looped path, in which the two sides of the loop are vertically arranged. In this type of machine, it is evident that eggs can be efficiently treated only on the upper reach of the conveyor, for otherwise expensive constructions must be used, to prevent the eggs from falling on the lower reach, or else to keep the carriers nevertheless right side up. In other types of machines, it is necessary to remove the egg carriers or trays bodily from the machine in order to load and unload.

It is accordingly one of the objects of my invention to obviate these mechanical difficulties in a simple and inexpensive manner.

I accomplish these results by utilizing a path of travel for the conveyor and its associated egg carriers that renders the entire path useful for operating on the eggs; this is done by arranging the travel substantially entirely in a horizontal plane, forming an endless orbital path. Preferably, for mechanical convenience, the path is circular; but other forms could, if desired, be used.

It is evident that the reentrant horizontal path so formed permits a single operator to load and unload the machine at the same point; this is useful during the slack periods when comparatively few eggs are going through the machine. On the other hand, when the annular or orbital path carries a large number of eggs simultaneously, a plurality of operators can be utilized, separately to load, unload, and candle or grade the eggs. It is therefore another object of my invention to provide an apparatus that can be as well operated by a single person, as by a plurality of persons.

It is another object of my invention to provide a novel form of temperature regulator for the oil or other liquid used to treat the eggs.

It is another object of my invention to provide a simple and inexpensive carrier for the eggs, that can be used in connection with this machine.

My invention possesses many other advantages, and has other objects which may be made more easily apparent from a consideration of a few forms of my invention. For this purpose I have shown several embodiments in the drawings accompanying and forming part of the present specification. I shall now proceed to described these embodiments in detail which illustrate the general principles of my invention; but it is to be understood that this detailed description is not to be taken in a limiting sense, since the scope of the invention is best defined by the appended claims.

Referring to the drawings:

Figure 1 is a plan view of the invention in use.

Figure 2 is a view partly in section and side elevation.

Figures 3 and 4 are cross sections at right angles to each other of the preservative tank.

Figure 5 is a detail plan of one end portion of the preservative tank.

Figure 6 is a detail plan of one of the egg trays with the removable handle attached.

Figure 7 is a detail partly in section and side elevation of a tray upon the carrier and with the handle partly detached.

Figure 8 is a detail partly in front elevation and cross-section of the carrier locking device.

Figure 9 is a plan view of Figure 8.

Figures 10 and 11 are detail side elevations of portions of the dipper operating device.

Figure 12 is a vertical cross-section of a modified form of machine, taken approximately on the line 12—12 of Figure 13.

Figure 13 is a fragmentary plan view of the modified form of machine.

Figure 14 is a detail section of the mounting for the dipper arms.

Figure 15 is a front elevation on a reduced scale of one of the dippers, and

Figure 16 is a detail plan of a dipper on a larger scale than shown in Figure 15.

In the drawings *a* indicates an oblong open work frame to the upper end of which the angled rails 5 and 6 of a sectional annular track are secured as by rivets 7. The track forms a support and guideway for the relatively wide annular body 8 of a carrier which extends above the track and is rotatably supported by the inner rail 6. The carrier is rotated with a step movement by a horizontally movable pawl 9, the free end of which bears upon the upper edge of body 8 which is notched at intervals spaced apart for a distance corresponding to the throw of the pawl. The notch construction is illustrated in Figure 8 where 10 indicates a right triangular shaped notch extending inwardly from the edge of body 8 and conforming substantially to the cross sectional contour of the free end portion of the pawl, and proportioned so as to receive the same so that the pawl when turning in one direction imparts rotary movement to the body 8 but slides out of the notch and upon the edge of body 8 when turning in the opposite direction. The pawl 9 extends across the space bounded by body 8 and is loosely connected as by a pivot 11 to a bracket 12 carried by the track rail 6. The loose connection affords a slight amount of vertical swinging movement of the free end of the pawl on entering and moving out of any of the notches 10.

The pawl 9 is oscillated by a rock arm 13, the free upper end of which extends loosely through a central recess 14 in the pawl and the lower end of which is pivotally connected to the frame by a transverse shaft 15 mounted in bearing 16. The rock arm 13 is moved in one direction by a segmental cam 17 which operates upon a bearing roller 18 extending laterally from the lower portion of the rock arm. This cam 17 is secured to a rotatable shaft 19 journalled in oppositely disposed bearings 20 carried by frame *a*. The cam 17 operates the rock arm 13 to turn the pawl in a direction which rotates the body 8 of the carrier when the pawl is engaged with one of the notches 10 and in this movement of the rock arm a weight 21 connected to the upper portion of the rock arm by a flexible element 22 trained over a pulley 23 is raised, so that when the cam turns away from the bearing roller 18, the weight descends and restores the rock arm to its original position and in so doing the free end of the pawl 9 is withdrawn from one notch and carried into the succeeding notch in body 8.

A solution tank 24 is secured within the upper portion of frame *a*. In order to insert the eggs into the solution in tank 24 for preserving or otherwise treating them, there is provided a vertically movable dipper *b* within the tank 24. This dipper includes a pair of horizontal rail supports 25 and 26, and a rectangular base frame 27. The vertical posts 28 secured at opposite points of the middle line of base frame 27 are slidable in guides 29 secured to frame *a*, which guides prevent displacement of the dipper when moving into and out of tank 24. The dipper is operated to slide vertically by a plunger rod 30 extending through a stuffing box 31 in the bottom of tank 24 and through a lower guide 32 carried by frame *a*. The upper end of the plunger is secured to the base frame 27 and spaced stops 33 and 34 on the lower portion of the rod and disposed on either side of the lower guide limit the vertical movement of the plunger.

The plunger 30 is operated by a lever 35, one end of which is slidably connected as by a pin and slot 36 to the stop 33, and the lever is operated by a rock shaft 37 to which it is fixedly secured and which is mounted for turning movement on the frame as by the aid of bearing 38. A crank arm 39 fastened to one end of the rock shaft 37 is operated to move in one direction through the force exerted by a compression spring 40, and to move in the opposite direction through the force exerted by a compression spring 41 of greater length than spring 40. The springs 40 and 41 are alternately compressed by the action of a draw bar 42 in conjunction with the crank arm 39 (Figs. 10 and 11) of the rock shaft 37, and another crank 43 fixed to one end of rotatable shaft 19 which carries the cam 17. In the embodiment shown, draw bar 42 is connected to one end by a wrist pin 44 to crank 43, and its other end extends through crank arm 39 in which it is slidable. The springs 40 and 41 are disposed one on each side of crank arm 39 and surround the draw bar. An adjusting nut 45 is screwed upon the screw threaded free end portion of the draw bar and provides means for obtaining variation in the compression of spring 40.

In Figure 2, dipper *b* is shown as lowered into the solution tank 24 and shaft 19 carrying crank 43 is rotating contra-clockwise with the crank 43 approximately 45° from the vertical on the down turn and the crank arm 39 slightly to the right of the vertical as viewed in Figure 2. In these positions of the parts, the progressive compression by the draw bar of short spring 40 is about to begin, but no movement on the part of lever 35 will take place until the spring 40 is compressed to a degree that overcomes the resistance due to the weight placed upon the free end of the lever by the dipper *b* less the counterbalancing effect of the weight 46 on the free end of lever 35. By this time crank 43 is approximately 90° from the vertical on the down turn and movement of crank arm 39 begins to the left in Figure 2 which causes lever 35 to lift dipper *b* alternatively to the dotted line position of Figure 2, by the time that crank 43 occupies the position shown in Figure 11. Continued movement of crank 43 from the position shown in Figure 11 has the effect of releasing the compression of spring 40, and compressing spring 41 progressively throughout the time lever 43 is moving through approximately 180° from the position shown in Figure 11, and to that shown in Figure 10. At an intermediate point in this movement of lever 43 however, approximately halfways thereof, the force exerted by spring 41 overcomes the inertia of the dipper $b$ and weight 46 and operates crank arm 39 to turn to the right in Figure 10, which causes lever 35 to pull dipper $b$ downwardly into solution tank 24. From the foregoing it is evident that the presence of springs 40 and 41 produce two intervals of lost motion on the part of dipper $b$, and these intervals are unequal by virtue of the difference in length between said springs, so that the dipper remains lowered within tank 24 for a longer period of time than when in elevated position above the tank.

The manner in which the eggs are supported in rows upon frame 27 of dipper $b$ will now be described. For this purpose, the rotatable ring 8 carries in a detachable manner, a series of egg carriers $c$, one of which is shown in greater detail in Figs. 6 and 7. These carriers in the present instance are shown as grids. The grid $c$ shown in Figure 6 comprises a series of parallel spaced tines 47 having oppositely disposed notches or serrations which cooperate to provide a number of sockets or spaces 48 disposed in conformity with the openings of an ordinary paper board cell member or filler forming one of the layers found in an ordinary crate of eggs. Tines 47 are connected together at one end by a channelled strip 49 which is engageable by the hooked terminal 50 of a detachable lifter 51, having a depending lug 52 arranged to bind on the outer side of strip 49 and thereby prevent turning of the grid in the lifting thereof. Grid $c$ is proportioned so that it may be readily lowered into the tank 24 when it is moved by the ring 8 to a position such that its ends bear upon the rails 25 and 26 of the movable track section carried by dipper $b$ as shown in Figure 2.

The apparatus is so arranged that while the eggs are lowered in tank 24, they are prevented from floating to the top of the solution. For this purpose, a cap comprising a flat rectangular base portion 53 of wire cloth is disposed above the track rails 25 and 26 and is connected at opposite portions as by rivets 54 to the terminal portions of the arms of a yoke 55 which carries a vertical bar 56 slidable in a cross piece 57 connected to the upper ends of the posts 28. A lifting device is provided for automatically lifting the cap independently of dipper $b$, when the eggs have been returned to the top of tank 24. This device comprises a link 58 pivotally connecting the bar 56 with a fixed standard 59 upon the cross-piece 57; and a rod 60 pivotally connected at its upper end to the outer end of the link and having its lower end portion slidable in a recessed lug 61 extending laterally outward from the frame $a$. A stop as a nut 62 is screwed on the rod 60 and is disposed below the lug 61. This stop is not passable through the recess of the lug and when the cap lowers into the tank the stop moves downwardly away from the lug 61. In the upward movement of the cap by the dipper the stop abuts the lug 61, immediately before the end of the upward movement of the dipper and thereby holds rod 60 against movement. The rod 60 now exerts a pull on the outer end of link 58 so that the inner end thereof moves upwardly lifting the cap relatively to the dipper until stop 34 abuts guide 32.

The manner in which the grids or carriers $c$ are removably supported by the carrier ring 8 will now be described. A series of spaced arms 63 extend radially outward from the carrier 8 to which the inner ends of the said arms are rigidly connected. Each arm carries at its outer end a head comprising a socket portion 64 which receives the outer end of the arm and upwardly and downwardly converging lugs 65 secured to opposite side portions of the socket. The arms are spaced for regular intervals around the carrier 8 and the distance between adjacent sides of any two of the heads corresponds approximately to the width of grid $c$.

In Figure 6 oppositely disposed notches 66 are shown, cut into the sides of the grid and are disposed so as to receive the adjacent lugs 65 of any two adjacent heads when the grid is lowered upon the carrier by the operator. The grids $c$ slide along guides 5 and 6 as the ring 8 is moved. In the operation of the device thus far described the operator proceeds to effect the transfer of a layer of eggs from a paper board cell or filler by inserting the grid underneath the filler and then lifting the latter away from the eggs. In this operation handle 51 may be attached to the grid so that the latter may be readily transported to the carrier 8.

In the upper portion of the frame adjacent to the solution tank 24 and underneath the track a candling device is arranged. This comprises a frame 67 in which are arranged a cluster of electric bulbs 68. When arranging the first grid of eggs upon the carrier, the grid is lowered into the space over the candling device and in the interval between movements of the carrier opportunity is had to observe and remove defective eggs from the grid. When cam 17 turns into contact with bearing roller 18 and moves carrier 8 the grid is turned away from the candling device and carried upon the rail sections 25, 26 of the movable track. At this time base 53 of the cap is elevated for an appreciable distance above the eggs by virtue of the additional upward movement it received through the action of the link 58 in the upward movement of the dipper so that sufficient clearance is provided for the eggs in moving the grid upon the dipper. In these positions of the parts, spring 41 is about to be compressed by draw bar 42 and the base 27 of dipper $b$ is above the surface of the fluid column 69 in solution tank 24. When spring 41 rocks crank arm 39 which causes lever 35 to pull downwardly on dipper $b$ the eggs are precipitated into the solution and at the same time base 53 of the cap is lowered upon the upper ends of the eggs. This action on the part of the cap takes place just before the eggs enter the solution and prevents the solution from acting to detach the eggs by reason of their comparative floatability. The carrier 8 remains inactive throughout the time that dipper $b$ is moving into and out of the tank and while the eggs are in the solution. Throughout this period the operating face of the cam 17 is turned away from bearing roller 18. When spring 40 elevates the dipper and after the cap moves upwardly away from the eggs, the operating face of cam 17 engages roller 18 and pawl 9 being then engaged with the carrier 8 turns the same which causes the grid of eggs to move away from the solution tank and upon the stationary sections 5 and 6 of the track.

In the downward movement of the grid with the dipper, the notched side portions of the grid readily detach themselves from the lugs 65 with which they readily engage when the dipper is elevated. During the dipping interval, the operator proceeds to arrange a second grid of eggs over the candling device and upon detachment of the first grid from the dipper its place is taken by the second grid. This operation is repeated with additional grids $c$ until the carrier moves the first grid around its orbital path, back again adjacent to the candling device. This grid may then be lifted from the carrier, and taken to the paper-board cell or filler, which can be readily slipped over the eggs, and deposited in an egg box by slipping the grid out from beneath the filler. A new layer of eggs is then transferred to the first grid which is returned to the candling device and the operations continued as before described.

From the foregoing it is to be observed that a single operator may perform the operations of transferring the eggs from the cells, candling, dipping and restoring the eggs to their original positions.

In Figures 1 and 2 a curved trough 69 is shown as underlying the stationary track rails to which it is secured. The trough extends from opposite ends of the movable track section and from these points its bottom 70 slopes downwardly. The purpose of the trough is to provide a receptacle and conduit for the excess quantity of solution which drips from the eggs while they are in movement from the solution tank around to the candling device. An outlet pipe 71 conveys the solution from the trough into a storage tank 72.

For operating the devices previously described, a motor 73 is employed. A belt 74 connects the motor with a pulley 75 keyed to a shaft 76 which is connected by a reducing train of gearing $e$ to the shaft 19; a pump shaft 77 also operated by the train $e$ is connected to a reciprocating pump 78. A pipe 79 is connected to the pump and extends from storage tank 72 to a gravity feed tank 80 in the upper part of frame $a$ and communicating with the solution tank through a pipe 81. An overflow 82 extends from tank 80 to storage tank 72.

The solution 69 is heated and circulated through tank 24 by means of a heater including a gas burner 83 which heats a circulating coil located in a casing 84. The inlet end of said coil is connected as at 85 to the bottom of tank 24 and the outlet end 86 connected to the upper inlet opening 95 of the tank. The details of the control of the circulation are shown in Figs. 3, 4 and 5. A pivoted valve 87 controls the inlet end portion 86 of the coil and this valve is operable by a thermostatic bar 88 located within the solution tank and secured at one end as indicated by 89, its free end being connected to a push rod 90 extending through a crank arm 91 carried by pivot pin 92 of the valve. A compression spring 93 surrounds the rod and is retained by the adjustable head thereof to bear upon the crank arm 91 to hold the valve open. When the rod curves downwardly upon the solution attaining the upper limit of the desired temperature, it operates against the action of the spring to close the valve and cut off circulation through connection 86.

In Figure 1, 94 indicates a by-pass connection extending from the outlet portion 86 to another inlet in the upper portion of the solution tank. This by-pass provides a cooling means for the solution when overheated by conveying the same outwardly for a considerable distance so that when the solution finally enters the tank, the temperature will approximate that required. A pump 95' is connected by a pipe line 95 for charging the storage tank 72 from a source of supply whenever desired.

In Figures 8 and 9 a means is shown for positively locking the carrier 8 against movement when the dipper is lowered into the solution tank. In this connection a finger 97 depending from pawl 9 strikes a pin 98 extending outwardly from an overbalanced latch bar 99 pivoted as at 100 to a track rail 6.

This causes the upper curved end 101 of the latch bar to move into engagement with a pin 102 extending from carrier 8, so that the latter is locked until the pawl is retracted by the weight 21 at which time the latch bar is free to yield and permit overriding of the pin when the carrier is moved.

In the embodiment just described, a series of egg carriers are intermittently moved in a closed orbital path which is in substantially a horizontal plane. Since the egg carriers c extend in about the same horizontal plane, it is evident that as many stations for operating on the eggs can be used as the path will accommodate, without any loss in the extent of the path, and without it being necessary to take the eggs off the machine. In the modified form now to be described, substantially the same effect is secured, except that a continuous motion is utilized in place of the intermittent one.

In the modified form shown in Figures 12 to 16 inclusive, a vertically extended socket 103 disposed centrally of a frame 104 forms a bearing for the lower end of a vertically extending shaft 105. At the top of this shaft there is fastened a circular head 106 peripherally recessed as at 107 for the reception of the inner ends of a plurality of radially disposed dipper arms 108 which extend into the recesses and are connected together by an annular pintle 109 extending through openings in the inner ends of the arms and disposed in a circumferential groove in the head 106. A collar 110 rigidly secured to shaft 105 as by a set of screws 111 provides a base support for the head 106.

The outer end portions of the arms are provided with disk-like enlargements 112 which are slidably fitted between arms 113 of a number of spaced yokes, each of which is secured to the arm 114 of a wheel disposed below head 106. The spokes 115 connect the arm 114 with the hub 116 which is keyed to a shaft 105. In this way rotary motion of the shaft is transmitted by the yokes to the arms 108 and the head 106. The outer terminal portions of the arms 108 are provided with rollers 117 which bear upon the annular track 118 which supports the arms. The upwardly bent outer end portions 125 of the arms 126 of a spider are rigidly secured to the track 118 and support the same, the central portion of the spider having an opening for the loose reception of the shaft 105 and supported by a collar 127 secured to the shaft. The egg trays or dippers have vertical back portions 119 connected to the dipper arms 108 as by the aid of socket 120 for receiving the outer terminals of the arms, and set screws 121 for rigidly securing the dippers by binding on the arms. The base portions 122 of the dippers extend outwardly from the lower ends of the portions 119 and are provided with a multiplicity of cells 123 for the reception of the eggs 124 to be dipped.

Opposite portions of a sector of the track are sloped downwardly as at 128 and 129 and then upwardly as at 130 and 131 so as to provide connected portions substantially V-shaped in contour. In the rotation of the dippers they successively pass downwardly and upwardly through these V-shaped portions so that the trays are successively dipped twice in a bath, such as one of preservative solution 132 within the solution tank 133 which is disposed immediately below the lowest portions of the V-shaped portions of the track. A partition 134 divides the tank into two compartments. The compartment on the left in Figure 12 contains a heated solution and the liquid in the compartment on the right of Figure 12 is cool.

It will also be noted that the horizontal distance between the inclined portions 128 and 131 of the track 118 is longer than the horizontal distance between the inclined portions 130 and 129, so that the eggs remain in the preservative solution for a longer period of time than in the cool liquid. It will be further noted that in the dipping of the eggs, the action of the parts is continuous. When the dippers are successively lifted from the cooling fluid, they pass over a tray 135 which receives the excess liquid as the same drains from the surfaces of the eggs. The tray is supported by the uprights 136 of a frame, to which is also connected the solution tank 133. The base of the frame is indicated by 137 and extends around the frame 104.

Uprights 138 on frame 104 are provided with bearings for a shaft 139 to which is secured a drive wheel 140 adapted to be connected to a motor. A train of gearing 141 connects the shaft 139 with a worm shaft 142 which operates a worm gear 143 on the lower end portion of shaft 105. A pump 143 connected to shaft 139 communicates with the solution tank 133 through a pipe line, a portion of which is indicated by 144 and also with a reservoir for preservative solution by a connection not shown. In this way the operator is enabled to keep the preservative solution replenished in the compartment on the left in Figure 1.

A heater 145 is supported in spaced relation to the bottom of tank 133 and under the compartment for the heated preservative solution. A pivoted flue 146' is movable over this heater so as to direct the air heated thereby upwardly and away from the tank 133 and is also movable to the position shown by dotted lines in Figure 13, or away from the heater so as to permit the same to heat the preservative fluid. This action on the part of the flue is automatic and a thermally responsive device is employed for operating the flue to cut off heat to the preservative solution after the same attains a predetermined temperature. In the present instance I have shown a thermostatic bar 146 secured at one end within the tank, as indicated at 147. The free end of this bar is provided with a contact plate 149 forming one end terminal of an electric circuit, the wires of which are indicated by 150. A solenoid 151 is included in the electric circuit and the core 152 of the solenoid is connected as by a link 153 to a crank 154 or its equivalent rigidly secured to the flue 146'. It will be noted that a vertical portion of the flue extends upwardly beyond the outer side of the machine, and its lower portion is bent inwardly and downwardly under the bottom of the tank and terminates in a cap or deflector 155 which extends over the heater when the circuit through the solenoid is closed and the core projected.

In this type of the machine (and in fact the first form also) the eggs can be loaded and unloaded without removing the trays or grids. For loading, the filled filler with its pasteboard bottom or on a shovel is placed over the tray and the bottom can then be removed, permitting the eggs to fall through the filler. To remove the eggs, it is merely necessary to raise the eggs by the aid of a shovel first placed beneath the carrier or grid; then the empty filler can be placed over them, and finally another shovel or pasteboard bottom can be inserted between the filler and the tray.

I claim:

1. In a machine for operating upon eggs, a rod, means carried by said rod for supporting eggs, means for pivoting the rod adjacent one end on a horizontal axis, means for moving the rod about a vertical axis adjacent the horizontal pivot, and means for guiding the free end of the rod in the course of its movement about the vertical axis so as to vary the level of said free end.

2. The combination as set forth in claim 1, in which the guiding means for the free end of the rod comprises a cam track, and a follower attached to the rod and engaging the track.

3. In a machine for treating eggs, a plurality of egg carriers, means to cause the carriers to travel around a common vertical axial center, and means disposed with respect to the path of travel of the carriers to permit the carriers to be singly subjected to a liquid bath, in succession with the positioning of other of the carriers at different angular positions with respect to the aforesaid axial center.

4. In a machine for operating upon eggs, means for imparting motion to the eggs in a horizontal path, one or more egg carriers arranged to be moved by said means, said carriers each having horizontally projecting parts forming recesses for accommodating the eggs, said recesses having such vertical depth which permits loading and unloading while the machine is in operation.

ANDREW E. LINDSTROM.